(12) United States Patent
Hoyer et al.

(10) Patent No.: US 10,013,671 B2
(45) Date of Patent: Jul. 3, 2018

(54) ELECTRONIC WORKSHEET WITH REFERENCE-SPECIFIC DATA DISPLAY

(71) Applicants: Timo Hoyer, South San Francisco, CA (US); Sascha Hans Grub, Saarbruecken (DE)

(72) Inventors: Timo Hoyer, South San Francisco, CA (US); Sascha Hans Grub, Saarbruecken (DE)

(73) Assignee: SAP SE, Walldorf, DE (US)

( * ) Notice: Subject to any disclaimer, the term of this patent is extended or adjusted under 35 U.S.C. 154(b) by 514 days.

(21) Appl. No.: 13/693,517

(22) Filed: Dec. 4, 2012

(65) Prior Publication Data

US 2014/0157165 A1    Jun. 5, 2014

(51) Int. Cl.
*G06F 3/00* (2006.01)
*G06Q 10/10* (2012.01)
*G06F 3/0481* (2013.01)
*G06F 3/048* (2013.01)

(52) U.S. Cl.
CPC .......... *G06Q 10/10* (2013.01); *G06F 3/0481* (2013.01); *G06F 3/048* (2013.01)

(58) Field of Classification Search
CPC ....... G06F 3/0481; G06F 3/0484; G06F 3/048
USPC ......................................... 715/769
See application file for complete search history.

(56) References Cited

U.S. PATENT DOCUMENTS

| | | | | |
|---|---|---|---|---|
| 2008/0229223 A1* | 9/2008 | Kake | ..................... | G06F 3/0481 715/764 |
| 2009/0288028 A1* | 11/2009 | Gohda et al. | ................. | 715/769 |
| 2010/0179844 A1* | 7/2010 | LaFergola | ................ | G07C 5/08 701/31.4 |
| 2011/0022982 A1* | 1/2011 | Takaoka | .............. | G06F 3/04817 715/810 |
| 2011/0295863 A1* | 12/2011 | Weir | ................. | G06F 17/30973 707/754 |
| 2012/0151398 A1* | 6/2012 | Foy et al. | ...................... | 715/769 |
| 2013/0346898 A1* | 12/2013 | Kokemohr | .................... | 715/769 |
| 2014/0059496 A1* | 2/2014 | White et al. | .................. | 715/841 |

OTHER PUBLICATIONS

"SAP Business ByDesign Dashboard", SAP AG, 2011, 4 pages.

* cited by examiner

*Primary Examiner* — Kieu Vu
*Assistant Examiner* — Andrew Chung
(74) *Attorney, Agent, or Firm* — Brake Hughes Bellermann LLP (57) ABSTRACT

The present description refers to a method, apparatus and computer-readable storage medium for displaying an electronic worksheet that includes an object display area to display one or more objects and an object storage clip for attaching one or more objects in an object stack, attaching a first reference object to the object storage clip, the first reference object including a first reference parameter, and displaying a first information object in the object display area, where data displayed by the first information object is specific to the first reference parameter of the first reference object attached to the object storage clip.

23 Claims, 10 Drawing Sheets

ELECTRONIC WORKSHEET WITH REFERENCE-SPECIFIC DATA DISPLAY

TECHNICAL FIELD

This description is directed generally to information objects and display of data, and in particular, to an electronic worksheet with reference-specific data display.

BACKGROUND

In the context of business meetings, presentations and other situations where data may be presented, presenters may present various information objects, such as reports, business contacts, graphical information or photos, and the like. There are many different ways to organize objects for display. It can be difficult in some cases to present information from multiple objects in an organized manner. In some cases, paper copies of presentations are provided to users, which can be inconvenient for the presenter.

SUMMARY

In one general aspect, a computer-readable storage medium is provided that stores one or more programs, the one or more programs including instructions, which when executed by a computer, cause the computer to display an electronic worksheet that includes an object display area to display one or more objects and an object storage clip for attaching one or more objects in an object stack, attach a first reference object to the object storage clip, the first reference object including a first reference parameter, and display a first information object in the object display area, where data displayed by the first information object is specific to the first reference parameter of the first reference object attached to the object storage clip.

In another general aspect, a computer implemented method is provided that includes displaying an electronic worksheet that includes an object display area to display one or more objects and an object storage clip for attaching one or more objects in an object stack, attaching a first reference object to the object storage clip, the first reference object including a first reference parameter, and displaying a first information object in the object display area, where data displayed by the first information object is specific to the first reference parameter of the first reference object attached to the object storage clip.

In another general aspect, an apparatus includes displaying logic configured to display an electronic worksheet that includes an object display area to display one or more objects and an object storage clip for attaching one or more objects in an object stack, attaching logic configured to attach a first reference object to the object storage clip, the first reference object including a first reference parameter, the displaying logic further configured to display a first information object in the object display area, where data displayed by the first information object is specific to the first reference parameter of the first reference object attached to the object storage clip.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described herein.

In addition, the subject matter described herein may also be implemented as a system including a processor and a memory coupled to the processor. The memory may encode one or more programs that cause the processor to perform one or more of the method acts described in this specification.

The details of one or more implementations are set forth in the accompanying drawings and the description below. Other features will be apparent from the description and drawings, and from the claims.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
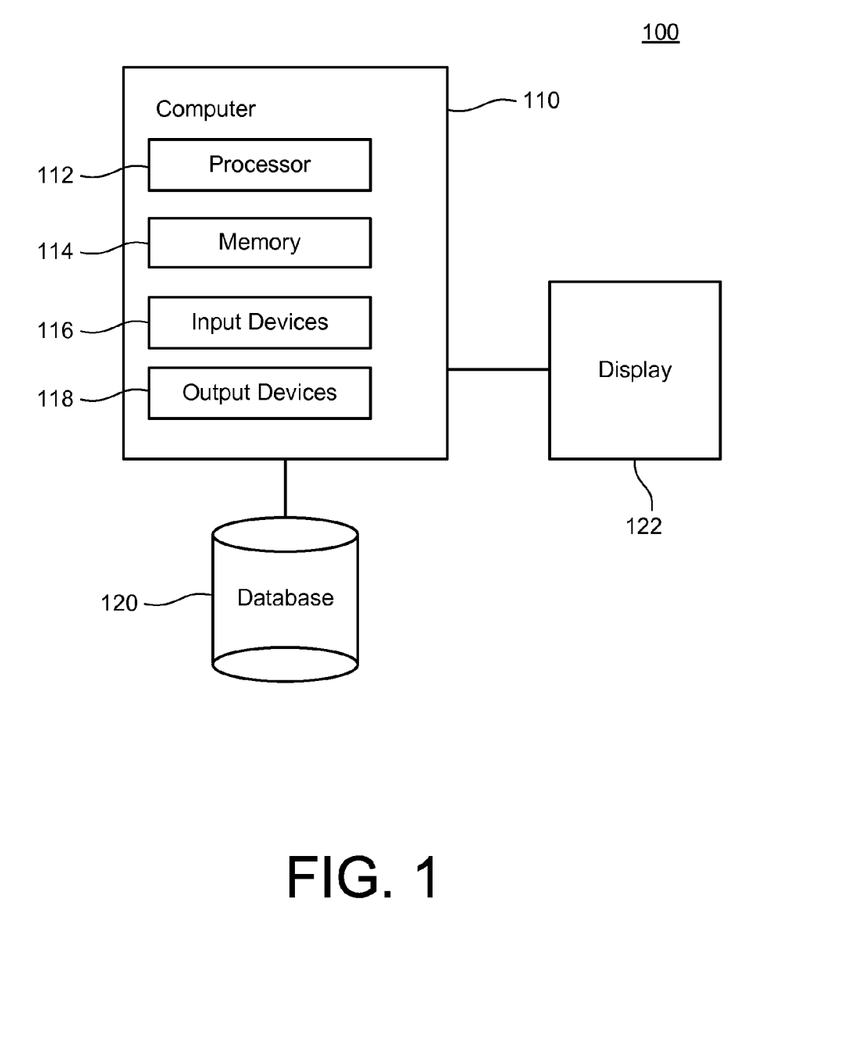
FIG. 1 is a block diagram of a system according to an example implementation.

FIG. 1 is a block diagram of a system according to an example implementation. System 100 includes a computer 110 and a database 120. Computer 110 may include a processor 112 for executing instructions and providing control for computer 110, a memory for storing computer instructions and other information, input devices 116, and output devices 118. Input devices 116 may include a keyboard/keypad, a mouse, a trackball or other pointing device, a touchpad, a touchscreen, or any other input device. Output devices 118 may include a display (or monitor) 122 for displaying information, a speaker, or other output device. In an example implementation, display 122 may be a touch screen display, e.g., provided as part of a tablet computer or similar, in which various items, icons and information objects may be tappable, selectable and draggable, for example. Although not shown, computer 110 may also include one or more network devices (e.g., wireless interface, Local Area Network interface, or other network interface) for allowing computer 110 to communicate with other computers via one or more networks, such as the Internet, a Local Area Network (LAN), a Wireless Local Area Network (WLAN), or other network. System 100 also includes a database 120 for storing information, such as various information objects, reports, etc.

Figure 2:
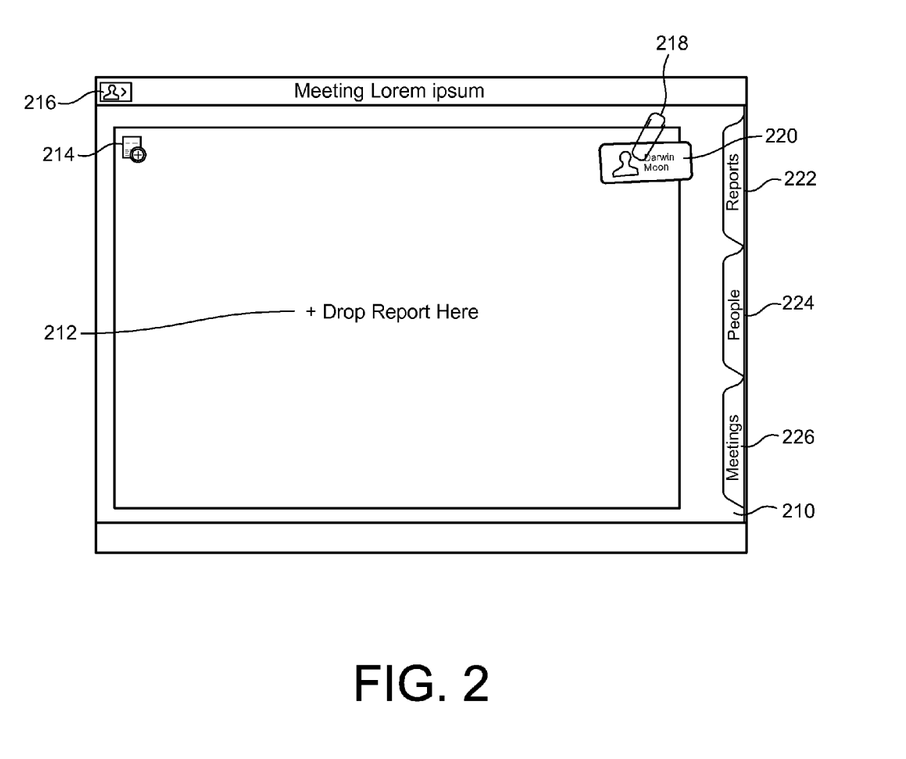
FIG. 2 is a diagram illustrating an electronic worksheet according to an example implementation.

FIG. 2 is a diagram illustrating an electronic worksheet according to an example implementation. Electronic worksheet 210 may be used to facilitate the presentation of information, such as displaying, sharing or presenting information during meetings, presentations, or the like. Worksheet 210 may include an object display area 212 for displaying one or more objects, a create note icon 214 for creating one or more notes, and a manager pane icon 216 for accessing employee or manager data, such as to access electronic business contacts or business cards for one or more managers.

Worksheet 210 may include a number of tabs, such as a reports tab 222 for accessing one or more reports, a people tab 224 for accessing contacts or business card information or employee information for one or more people, and a meetings tab 226 for accessing information, including a previous worksheet 210 and objects that were stored or accessible on the worksheet 210 at one or more of such previous meetings.

Worksheet 210 may also include an object storage clip 218 for attaching or storing one or more objects in an object stack (or stack of objects). For example, one or more information objects may be attached or clipped to object storage clip 218. Objects that may be displayed within object display area 212 and/or attached to object storage clip 218, may include any information objects, which may include any file or object that contains information, such as, for example, a report, a presentation, a note, a text document, a graphical document, a picture, or other object.

Objects may be moved between object display area 212 and object storage clip 218, such as via drag and drop operations. For example, an object may be moved from object storage clip 218 to the object display area 212 to allow the object to be displayed or presented during a meeting. As an example, when a first object is provided on object display area 212 for presentation or display, one or more other objects may be stored or attached to object storage clip 218 for easy access during a meeting.

The object storage clip 218 may provide a convenient storage area where one or more objects may be attached, clipped or stored when not being displayed within the object display area 212. This may allow one or more objects to be displayed on object display area 212, while a remaining set of one or more objects to be attached or clipped to object storage clip 218 for access during the meeting or presentation. Objects attached to object storage clip 218 may be selected by a user and moved to the object display area 212 to be displayed. Similarly, for example, when a user is finished discussing or presenting an object that is displayed in object display area 212, the user may select and move (e.g., via a drag and drop operation) the object to the object storage clip 218, where such object is out of the way, but is still accessible by the user. Movement of such object from the object display area 212 to the object storage clip 218 may, therefore, free up space within object display area 212 so that one or more other objects may be displayed or viewed more easily, e.g., provides less crowding of objects within object display area 212.

According to an example implementation, objects may be displayed within object display area 212 up to a first size, such as a full size (e.g., up to the size of object display area 212), and may have an adjustable size of the displayed object. On the other hand, an object attached to object storage clip 218, may be displayed as a second or reduced size image (e.g., reduced size may be smaller than the full-size), such as an icon or thumbnail representing the object. Thus, for example, an object may change size as it is moved between object storage clip 218 and object display area 212. For example, objects displayed on object display area 212 may be larger or up to a full-size, or, for example, may be any size up to the size of the object display area 212, and then may be reduced in size and displayed or presented as a small-size icon or thumbnail representing the object when moved and attached to object storage clip 218. In addition, objects attached to the object storage clip 218 may be an adjustable size, or may be a default or fixed size.

An example information object is attached to object storage clip 218 in FIG. 2. In this example shown in FIG. 2, a reference object 220 is attached to object storage clip 218. According to an example implementation, a reference object may be an information object that is used as a reference for displaying information of another information object (or one or more other information objects). In this example shown in FIG. 2, reference object 220 is a Darwin Moon business card that may identify a person's name (Darwin Moon in this example), address, phone number, manager, business unit or division, and/or other information for this person or employee. In this example, Darwin Moon is an example name of a manager, employee and/or person. The Darwin Moon reference object 220 may be identified as a reference object by placing such object at the top (or other predefined location) of an object stack, or by using a drop-down menu, e.g., displayed by right clicking on the object, to classify or identify such object as a reference object, or by using other technique. In one example implementation, there may be one or less reference objects attached to object storage clip 218. In other example implementations, more than one reference object may be attached to object storage clip 218.

Each object may include one or more parameters or fields, such as a name, title, business unit, manager, address, phone number, etc. According to an example implementation, one of the parameters of a reference object may be identified or specified as a reference parameter. A reference parameter may be a parameter within the reference object that may be used as a reference for specifically displaying data of one or more objects within worksheet 210. According to an example implementation, a reference parameter may be specified in advance when the object is created, specified by default (e.g., name is default reference parameter) or may be identified or specified via a drop-down menu or using other technique. As an example, the name Darwin Moon may be used as a reference parameter for the reference object 220. In such case, data displayed for information objects provided on object display area 212 may be displayed specific to the reference parameter (Darwin Moon) of reference object 220. An object in the object display area 212 may display data specific to a reference object that is attached to object storage clip 218, or specific to a specific reference parameter of such reference object.

Data that is specific to Darwin Moon may include data that pertains specifically to Darwin Moon, his group, his accomplishments or work, or other data specific to Darwin Moon, and does not typically include, for example, general data or data that pertains to a general population, the company in general, or other people or other non-overlapping reference parameters, for example. For example, Darwin Moon may be a manager at company XYZ. A report may be provided within object display area 212 and initially displays a current number of employees for the company XYZ for the year 2011 (e.g., a bar graph, text or other information displayed in the report indicates 3,455 employees for company XYZ). Data displayed on other pages within the report, e.g., page 2, page 3, . . . may similarly be displayed for or specific to the company XYZ. The Darwin Moon reference object 220 may then be attached to object storage clip 218, which may cause computer 110 to modify or change the displayed data from the total number of employee of company XYZ to only the number (or subset) of employees (e.g., displayed as 256 employees) within Darwin Moon's group of company XYZ (e.g., specific to Darwin Moon). Thus, in this example, by attaching or clipping the Darwin Moon reference object 220 to object storage clip 218, this may cause a report displayed in object display area 212 to display data specific to the reference object 220 or specific to the reference parameter of the reference object 220. Other pages (not shown) within the report, e.g., pages 2, 3, 4, when displayed, may display other information, e.g., revenue, or sales numbers, specific to Darwin Moon (e.g., data may of such pages may be displayed specific to Darwin Moon's group within company XYZ, such as that portion of company revenue from or attributable to Darwin Moon's group).

Figure 3:
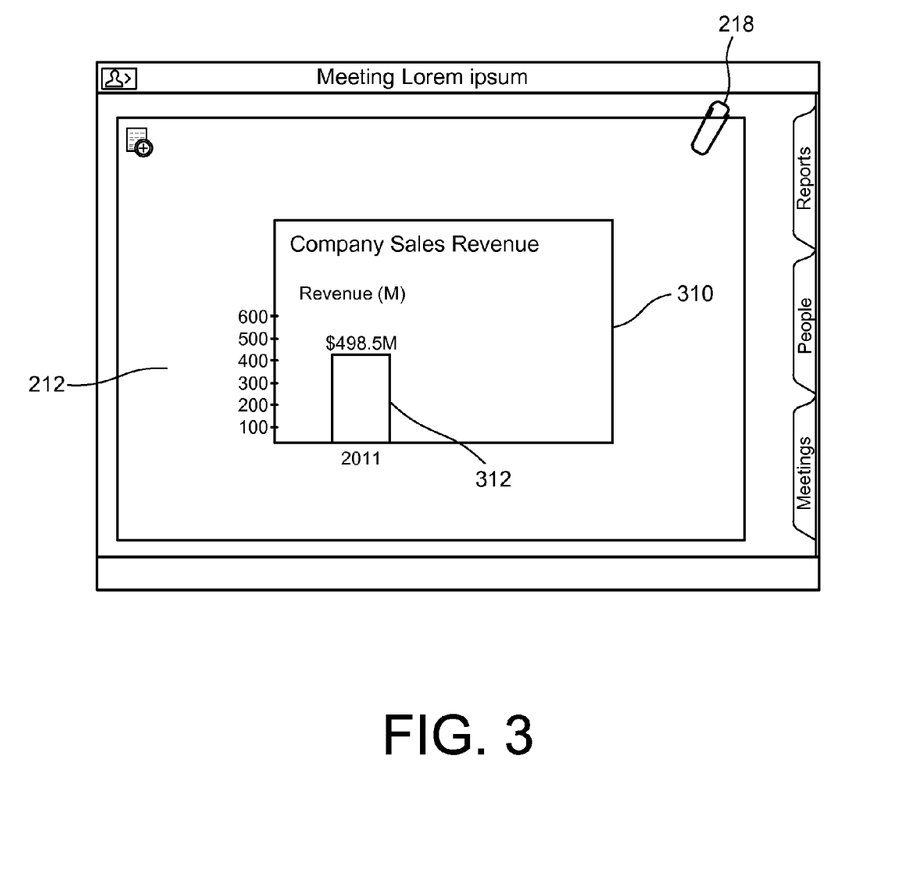
FIG. 3 is a diagram illustrating an electronic worksheet in which data 312 of a report 310 is displayed for a company, where no reference object is attached to the object storage clip.
Figure 4:
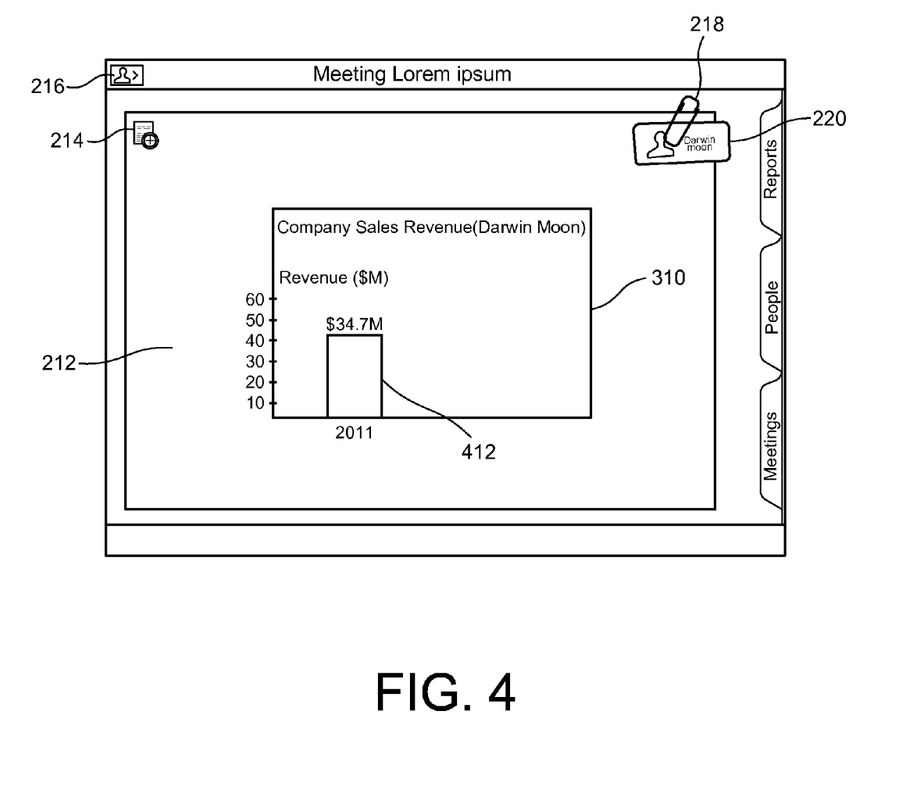
FIG. 4 is a diagram illustrating the electronic worksheet in which data 412 of the report 310 is displayed that is specific to a reference object attached to the object storage clip.

FIG. 3 is a diagram illustrating an electronic worksheet in which data 312 of a report 310 is displayed for a company, where no reference object is attached to the object storage clip. FIG. 4 is a diagram illustrating the electronic worksheet in which data 412 of the report 310 is displayed that is specific to a reference object attached to the object storage clip. In this example, FIG. 3 illustrates the electronic worksheet before a Darwin Moon reference object 220 has been attached to the object storage clip, and FIG. 4 illustrates the worksheet after the Darwin Moon reference object 220 has been attached to the object storage clip.

According to an example implementation, data may be stored in database 120, that includes 2011 company sales revenue (which may include total company sales revenue for 2011, and 2011 revenue subtotals for each of several business groups within the company, etc.). This is merely an example of the type of data that may be stored in database 120. For example, sales revenue data may also be accessible, or sortable (and displayable based on an attached or associated reference object/reference parameter), based on revenue for each product, for each line of products, for each sales month or other sales date, for each business group, for each manager, etc. Thus, a different reference object attached to clip 218 and/or a different reference parameter may result in different reference parameter-specific (or different reference object-specific) data being obtained from database 120 and displayed on or in an information object (e.g., report) provided within object display area 212.

Thus, according to an example implementation, the report in this example does not necessarily change, but the set or subset of data that is obtained or selected by computer 110 for display within the report may depend upon which reference object (if any), including a reference parameter of such attached reference object, is attached to the object storage clip 218. Therefore, for the same displayed report or other object within object display area 212, different data may be displayed (e.g., in graphical, numerical or other data format) depending on which, if any, reference object (and/or reference parameter) is attached to object storage clip 218.

Thus, with reference to FIG. 3, for example, prior to attaching reference object 220, a report 310 may be initially displayed on object display area 212 that identifies and displays data 312 (e.g., graphical or other data display) of all 2011 sales revenue for a company (e.g., total for all groups within the company). This data may be provided on just one page of the report 310, and report 310 may include other company related data on other pages that are not shown in FIG. 3. In the example shown in FIG. 3, sales revenue for the company is graphically displayed as a bar graph that indicates $498.5 million (M) in sales revenue for 2011 for the company.

Next, the Darwin Moon business card is selected from people tab 224 (FIG. 2) and a drag a drop operation may be used to attach or clip such Darwin Moon business card to object storage clip 218, where the Darwin Moon business card becomes a reference object 220. The Darwin Moon reference object 220 (FIG. 4) may include the name Darwin Moon as the reference parameter for such object, according to an illustrative example. In this example, Darwin Moon may be a manager who manages one of many business groups within the company.

As shown in FIG. 4, as a result of attaching the Darwin Moon reference object 220 to object storage clip 218, computer 110 modifies the data displayed (or selects a different set or subset of data to be displayed) on or as part of report 310 to include only the subset of the data that is specific to Darwin Moon. In the example shown in FIG. 4, in response to the reference object 220 being attached to object storage clip 218, computer 110 obtains and displays the subset of the 2011 sales revenue from (or attributable to) Darwin Moon's business group or division within the company. Thus, the reference parameter (Darwin Moon) of the attached reference object 220 may cause the data displayed on the 2011 sales revenue report to be modified or adjusted to display sales revenue specific to Darwin Moon's business group. Therefore, in this example, as a result of the attached Darwin Moon reference object 220, only data specific to Darwin Moon is displayed in the sales revenue report 310. Thus, the bar graph, or other displayed data showing sales revenue for report 310, is modified to shown $34.7 M in sales revenue for 2011 for Darwin Moon's business group, as shown in FIG. 4. Data display on other pages of report 310 may be similarly modified or adjusted to display data specific to the reference parameter or specific to the attached reference object, e.g., specific to Darwin Moon. Also, in this example, after attachment of the Darwin Moon reference object 220 to clip 218, any other information objects that are displayed within object display area 212 may similarly display data that is specific to the attached reference object or specific to the reference parameter of the attached reference object 220 (e.g., display data specific to Darwin Moon in this example).

Figure 5:
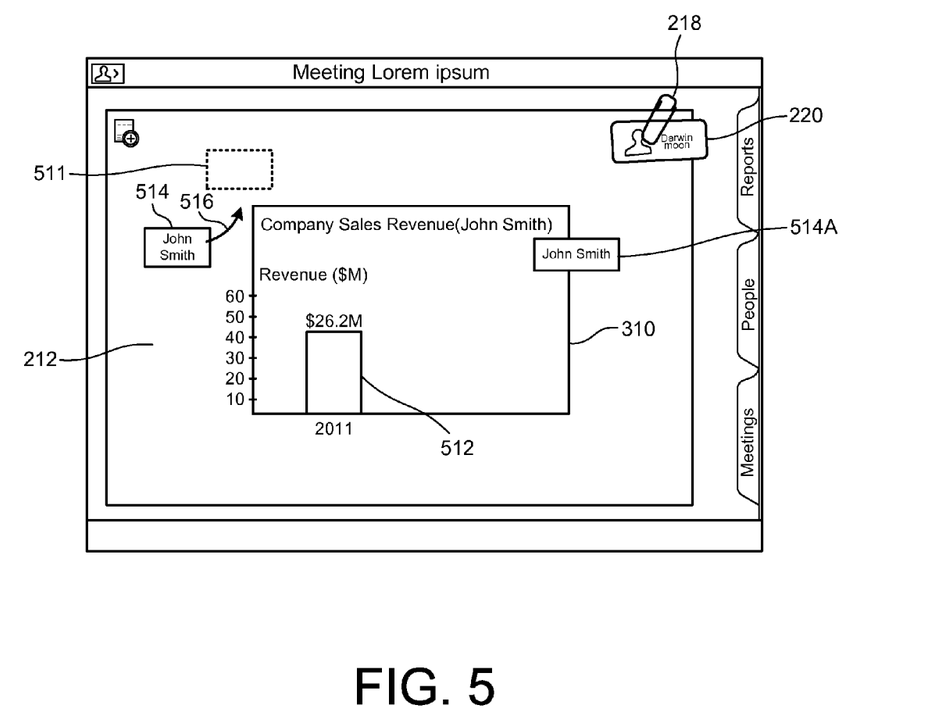
FIG. 5 is a diagram illustrating an electronic worksheet in which an object is associated with another object within the object display area.

FIG. 5 is a diagram illustrating an electronic worksheet in which an object is associated with another object within the object display area. Referring to FIG. 5, a John Smith business card 514 may be selected from people tab 224 (FIG. 2) and a drag a drop operation 516 may be used to move the John Smith business card 514 into the object display area 212, for example. If the John Smith business card 514 is dropped at a location that does not overlap report 310, such as location 511 within the object display area 212, for example, then the data displayed by report 310 would continue to be specific to Darwin Moon (and would continue to display the bar graph 412 as shown in FIG. 4), based on the attached Darwin Moon reference object 220 attached to object storage clip 218.

However, a user may instead associate the John Smith business card 514 with the report 310, for example, by attaching the John Smith business card 514 to the report 310 via a drag and drop operation. For example, the report 310 may blink, change color or shade, or have a border that changes its appearance, or provide other visual indication, when an object, such as the John Smith business card, is dragged onto the report 310, or hovers over the report 310, to indicate that such dragged object (John Smith business card in this example) may be associated with the underlying or base object (e.g., report 310) by dropping the dragged object at that point onto the underlying or base object. Once attached to the report 310, the John Smith business card 514 may be displayed at location 514A, for example, e.g., wherein such location 514A of the dragged object may be at least partially overlapping the report or underlying or base object to which the dragged object is now associated with. This is merely an example, and other techniques may be used to associate an object with another object, such as by using a drop-down menu to select "associate" or other command to associate one object with another object.

Once a first object has been associated with a second object (e.g., an underlying or base object), for example, both objects may move together (e.g., moving a first object also moves both objects together), and may be deleted together (e.g., deleting a first object results in both the first object and the associated second object being deleted together), for example. In this manner, associating two objects may result in them being attached or linked together, according to one example implementation.

In addition, when a first object in the object display area 212 is associated with a second object in the object display area 212, then the associated object (e.g., the John Smith business card 514) may cause the data that is displayed by second object (e.g., the underlying or base object) to be specific to the associated object, or specific to a reference parameter of such associated object. Thus, for example, if a second object is dragged into the object display area 212 and dropped at a location that does not overlap with a first object (e.g., no association created), then the first object may continue to display data specific to a reference object (and reference parameter of such reference object) that is attached to the object storage clip 218. However, if the first object is moved and then associated with the second object within the object display area 212 (e.g., via a drag and drop operation), then the data displayed by the second object is changed or modified to now display data that is specific to the first object (and/or a reference parameter of such first object). In such case, the first object may become a (local) reference object for the second object, where the associated first object may override the reference-specific command or operation of any attached reference object that may be attached to object storage clip 218. Therefore, a first reference object (e.g., report 310) provided within the object display area 212 may display data specific to a reference object (and reference parameter of such reference object) attached to the object storage clip 218, if there is no object that is associated (or attached) to the first object. However, if a second object is associated with the first object within the object display area 212, which causes the second object to now be a reference object, then the data displayed by the first object will modified or adjusted to now display data that is specific to the second object (or specific to a reference parameter of such second object). Thus, a reference parameter of an associated object within object display 212 can override the parameter-specific display caused by an object that may be attached to the object storage clip.

For example, if the John Smith business card 514 were dragged and dropped at location 511, e.g., without associating such business card 514 with the report 310, then the report 310 would continue to display data specific to Darwin Moon based on the Darwin Moon reference object 220 that is attached to object storage clip 218. However, if the John Smith business card 514 is associated with report 310, then the data displayed by report 310 would be modified or changed by computer 110 to display data specific to the associated John Smith business card 514, or to display data specific to a reference parameter (e.g., the name John Smith, or his group) of such associated John Smith business card 514.

Figure 6:
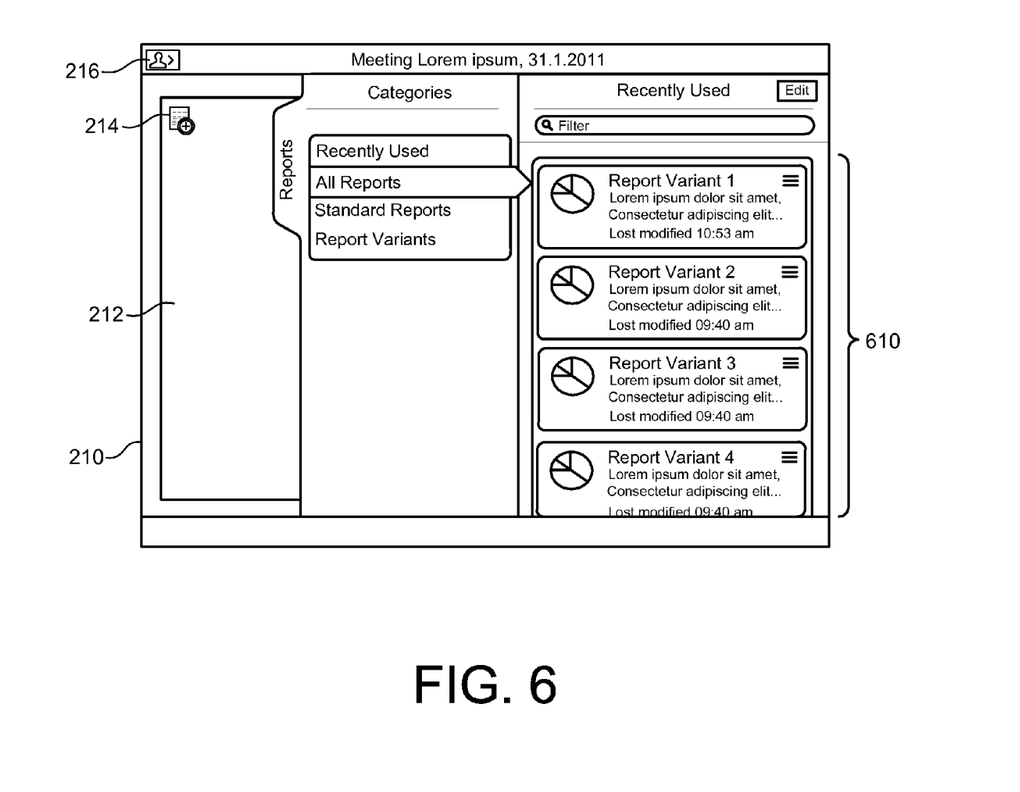
FIG. 6 is a diagram illustrating an electronic worksheet in which a report is selected.
Figure 7:
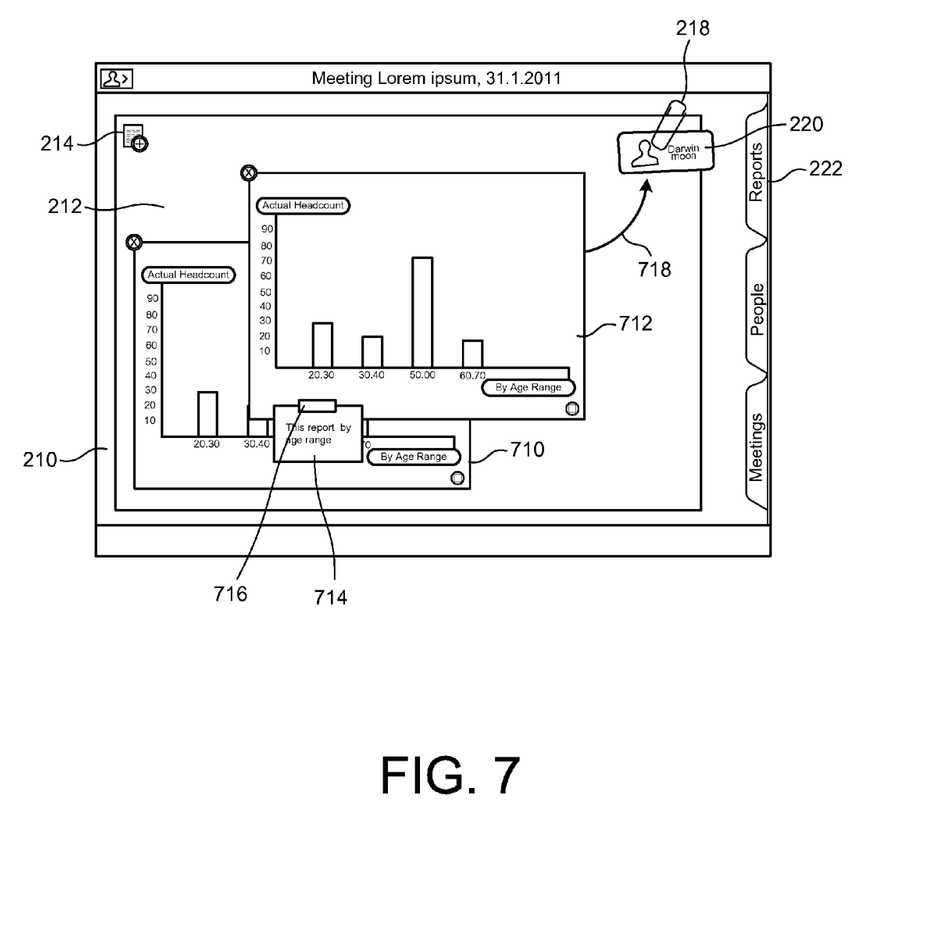
FIG. 7 is a diagram illustrating the electronic worksheet 210 of FIG. 6 in which two example reports have been placed onto the object display area 212.

FIG. 6 is a diagram illustrating an electronic worksheet in which a report is selected. According to an example implementation, a user may select the reports tab 222 (FIG. 2) icons 610 for one or more reports. A user may use a pointing device to drag and drop a report onto the object display area 212. FIG. 7 is a diagram illustrating the electronic worksheet 210 of FIG. 6 in which two example reports have been placed onto the object display area 212. In this example a first report 710 has been selected via reports tab 222, and moved onto the object display area 212 based on a drag and drop operation. Next, a second report 712 has been selected via reports tab 222 and moved onto the object display area 212, e.g., via a drag and drop operation. Also, during the course of a meeting, presentation, etc., a user may wish to create a note. Therefore, the user select the create note icon 214 to create a note. The new note may pop up, and may be positioned on the object display area 212, e.g., via a drag and drop operation. A keyboard may be used to type in or input text into the note.

In one example, a note 714, may be associated with the report 712 by dragging the note 714 over the report 712 and dropping the note onto the report 712, for example. An association indicator may be displayed (e.g., the appearance of tape attaching the note 714 to the report 712) to indicate that the note 714 has been associated or attached to the report 712, according to one example implementation. In this example, the note 714 may be disassociated from report 712 by selecting the note 714 and dragging it away from the report 712 to another location on the object display area 212, so that the note 714 is not on top of or touching the report 712, for example.

The reports 710, 712 and note 714 are examples of information objects that may be selected and moved (e.g., via drag and drop operations) to any location within the object display area 212. In one example implementation, both reports 710 and 712 may display data specific to Darwin Moon based on the attachment of the Darwin Moon reference object 220 to object storage clip 218, and because there are no additional reference objects associated with either of reports 710 or 712, in this example.

In addition, a reference parameter may be input or typed in to note 714, such as by typing in the manager's name, John Smith. If the note 714 is associated with report 712, and note has been identified as a reference object, the name "John Smith" within the note 714 may been selected as a reference parameter. In such case, note 714 may operate as a reference object for report 712. In such case, report 712 may display data (e.g., headcount forecast, and/or actual headcount) that is specific to John Smith or to John Smith's business unit or group. However, because there is no reference object associated with report 710, report 710 would continue to display data specific to Darwin Moon.

Figure 8:
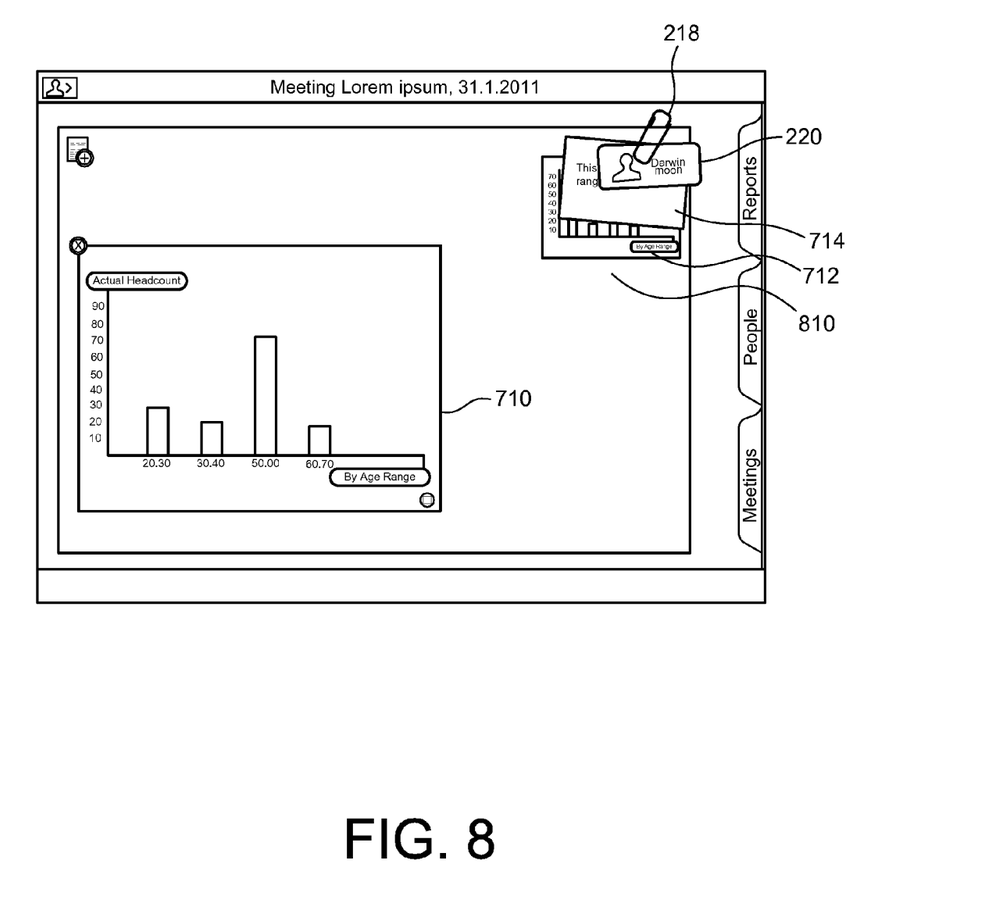
FIG. 8 is a diagram illustrating the electronic worksheet 210 in which report 712 and note 714 have been attached or clipped to the object storage clip 218.

In addition, as shown in FIG. 7, report 712 and/or note 714 may be moved to object storage clip 218. These objects 712 and 714 may be moved together based on their association, e.g., by dragging and dropping the objects as a unit onto the object storage clip 218, where the objects may then be separated (including disassociating the note 714 from the report 712) and displayed as separate icons or thumbnails in an object stack 810. Or, the report 712 and note 714 may be moved as separate objects, e.g., via separate drag and drop operations to move them to object storage clip 218. FIG. 8 is a diagram illustrating the electronic worksheet 210 in which report 712 and note 714 have been attached or clipped to the object storage clip 218.

As shown in FIG. 8, objects may be stored in an object stack 810 (or stack of objects) where objects are displayed in a slightly staggered or offset fashion, such that at least a portion of each object in the stack is displayed and/or viewable. The object stack 810 includes the Darwin Moon reference object 220, the note 714 and the report 712, according to this illustrative example. The objects in the object stack 810 are shown in a slightly staggered or offset and partially overlapping arrangement, e.g., where the note 714 is positioned slightly to the left and down from the reference object 220 and slightly overlapping object 220, and report 712 is positioned slightly to the left and down and partially overlapping the note 714. This staggered or slightly offset and partially overlapping arrangement of objects in the object stack 810 may allow multiple objects or all of the objects to at least be partially viewed or displayed, while occupying a limited amount of space.

Figure 9:
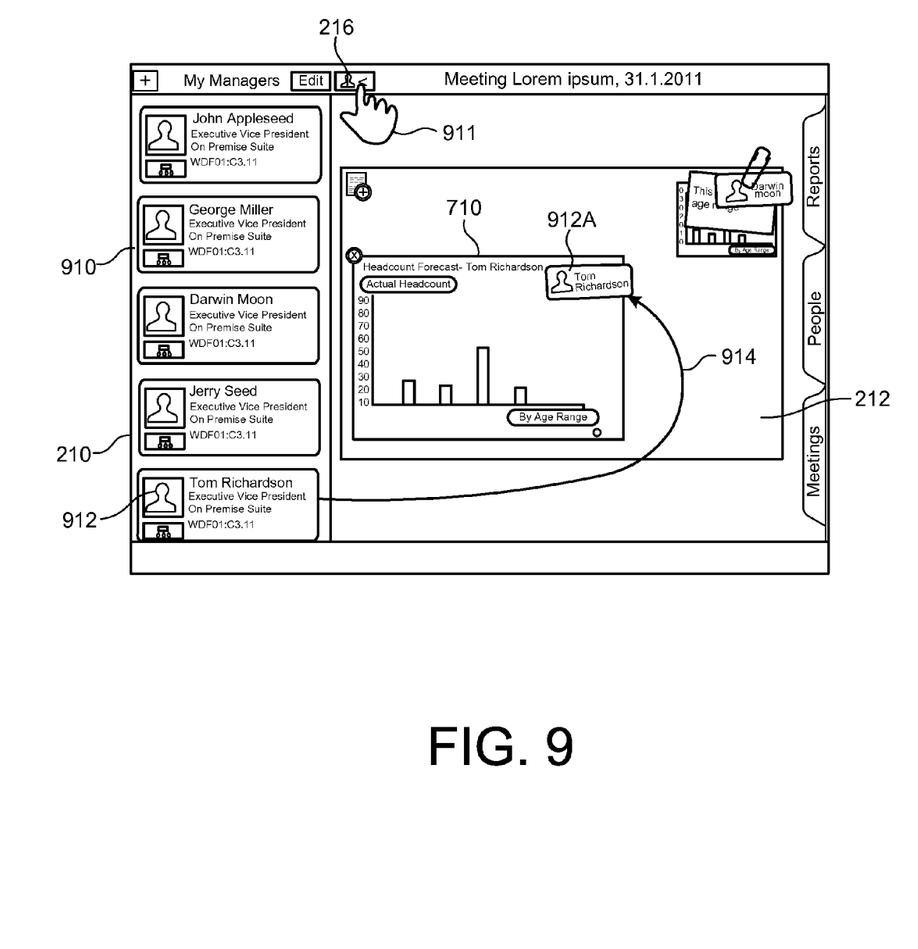
FIG. 9 is a diagram illustrating an electronic worksheet 210 in which a business contact is selected and moved to the object display area 212.

FIG. 9 is a diagram illustrating an electronic worksheet 210 in which a business contact is selected and moved to the object display area 212. In this example, a user may select (e.g., selection or point and click/select operation indicated by selection icon 911) the manager pane icon 216 which may cause a pane or group 910 of manager contacts for each of a plurality of managers to drop down or be displayed. After the group 910 of manager contacts is displayed, the user may select (e.g., via a point and click operation using a pointing device) the Tom Richardson contact 912 and drag it into the object display area 212. In this example, the Tom Richardson contact 912 may be dragged (shown as line 914) and dropped on top of the report 710, such that the Tom Richardson contact 912 is now associated with the report 710. The Tom Richardson contact 912 may automatically operate as a reference object for the report 710, Or, a drop down menu or other mechanism may be used to identify the Tom Richardson contact 912 as a reference object for the report 710. The name Tom Richardson may be specified as a reference parameter. After being associated with the report 710, the Tom Richardson contact 912 may appear as a smaller size object, such as a Tom Richardson icon 912A, provided on top of the report 712, for example.

As a result of the association of the Tom Richardson contact 912 with the report, where the Tom Richardson contact 912 operates as a reference object for report 712 (e.g., with the name Tom Richardson as a reference parameters), the report 712 will now display data (e.g., actual headcount or headcount data) specific to Tom Richardson, instead of displaying data specific to Darwin Moon.

Thus, according to an example implementation, the reference object 712 attached or associated with an information object may trump or override the data display preferences of a reference object (e.g., Darwin Moon reference object 220) attached to the object storage clip 218. Thus, a reference object attached to the object storage clip may provide data display preference (a reference-specific data display command, e.g., command for objects to display data specific to Darwin Moon) for multiple (or even all of the) information objects displayed within the object display area 212. On the other hand, a reference object associated with one information object within the object display area may provide a data display preference (or a reference-specific data display command) for the object to which it is associated with, and typically not for other objects within the object display area 212. Such locally attached reference object (e.g., Tom Richardson contact 912/912A locally associated with or locally attached to report 712) may also override the data display preference (or reference-specific data display command) generally provided by any reference object (e.g., the Darwin Moon reference object 220) attached to the object storage clip 218.

Figure 10:
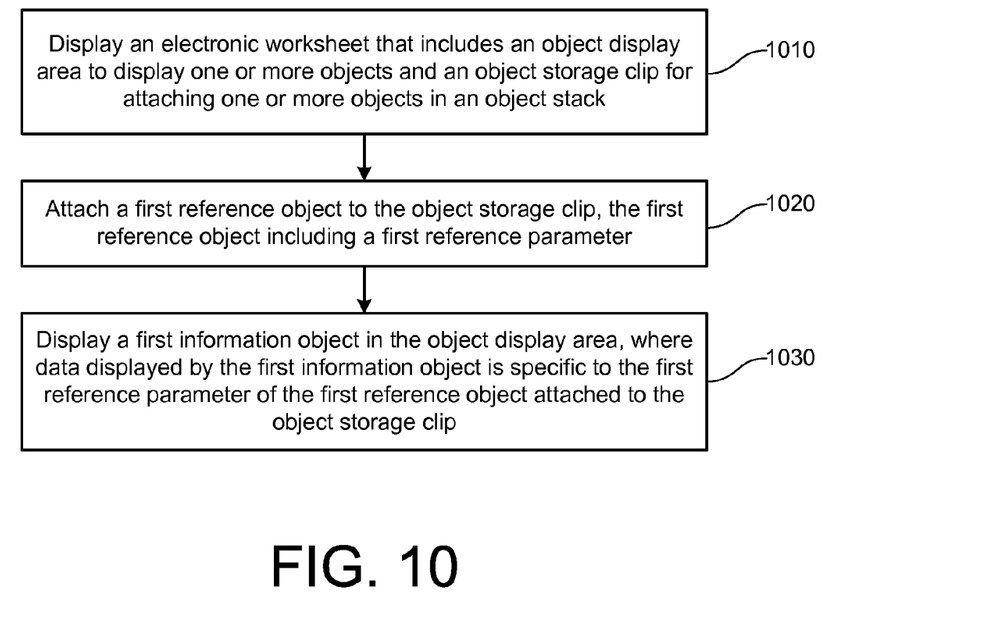
FIG. 10 is a flow chart illustrating operation of computer 110 according to an example implementation.

FIG. 10 is a flow chart illustrating operation of computer 110 according to an example implementation. At 1010 an electronic worksheet is displayed that includes an object display area to display one or more objects and an object storage clip for attaching one or more objects in an object stack. At 1020, a first reference object is attached to the object storage clip, the first reference object including a first reference parameter. At 1030, a first information object is displayed in the object display area, where data displayed by the first information object is specific to the first reference parameter of the first reference object attached to the object storage clip.

The method of FIG. 10 may further include associating a second reference object with the first information object, the second reference object including a second reference parameter. In an example implementation, the first information object displays data specific to the second reference parameter of the second reference object that is associated with the first information object.

The method of FIG. 10 may further include displaying a second reference object on the object display area, the second reference object including a second reference parameter. In an example implementation, the first information object displays data specific to the second reference parameter if the second reference object is associated with the first information object, and otherwise the first information object displays data specific the first reference parameter of the first reference object that is stored on the object storage clip if the second reference object is not associated with the first information object.

Figure 11:
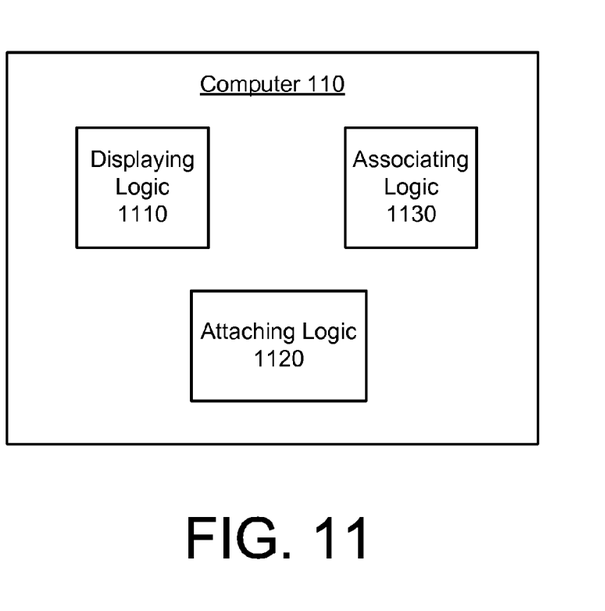
FIG. 11 is a diagram illustrating computer instructions or logic that may be executed or performed by computer 110 according to an example implementation.

FIG. 11 is a diagram illustrating logic that may be executed or performed by computer 110 according to an example implementation. Displaying logic 1110 is configured to display an electronic worksheet that includes an object display area to display one or more objects and an object storage clip for attaching one or more objects in an object stack. Attaching logic 1120 is configured to attach a first reference object to the object storage clip, the first reference object including a first reference parameter. In an example implementation, the displaying logic may be further configured to display a first information object in the object display area, where data displayed by the first information object is specific to the first reference parameter of the first reference object attached to the object storage clip.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machinereadable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A non-transitory computer-readable storage medium storing one or more programs, the one or more programs comprising instructions, which when executed by a computer, cause the computer to:
    display an electronic worksheet that includes an object display area to display one or more objects and an object storage clip for attaching one or more objects in an object stack;
    first, display a report in the object display area, the report including data related-to a first information object;
    next, attach a first reference object to the object storage clip, the first reference object including a first reference parameter; and
    then, modify the displayed report to include only data related to the first information object that is specific to the first reference parameter of the first reference object attached to the object storage clip.

2. The computer-readable storage medium of claim 1 wherein one or more of the objects are moveable between the object display area and the object storage clip through a drag and drop operation.

3. The computer-readable storage medium of claim 1 wherein the first reference object is movably attached to the object storage clip so that a user can detach the first reference object and attach a second reference object to the object storage clip, the second reference object including a second reference parameter, and wherein the one or more programs instructions, which when executed by the computer, cause the computer to modify the displayed report to include only data related to the first information object that is specific to the second reference parameter of the second reference object attached to the object storage clip.

4. The computer-readable storage medium of claim 1 wherein the first reference object comprises an information object that is used as a reference for displaying data for one or more other information objects.

5. The computer-readable storage medium of claim 1 wherein the objects may be moved between the object display area where each object may be displayed up to a first size image and the object storage clip where each object is displayed as a second size image in a stacked arrangement with other objects, wherein the second size is smaller than the first size.

6. The computer-readable storage medium of claim 1, wherein the instructions, which when executed by a computer, further cause the computer to:
    display a second information object on the object display area, where data displayed by the second information object is specific to the first reference parameter of the first reference object attached to the object storage clip.

7. The computer-readable storage medium of claim 1, wherein the instructions, which when executed by a computer, further cause the computer to:
    associate a second reference object with the first information object, the second reference object including a second reference parameter, wherein the first information object displays data specific to the second reference parameter of the second reference object that is associated with the first information object.

8. The computer-readable storage medium of claim 7, wherein the instructions causing the computer to associate comprise instructions that, when executed by a computer, cause the computer to:
drag the second reference object and drop the second reference object onto the first information object that is displayed in the object display area.

9. The computer-readable storage medium of claim 1, wherein the instructions, which when executed by a computer, further cause the computer to:
display a second reference object on the object display area, the second reference object including a second reference parameter,
wherein the first information object displays data specific to the second reference parameter if the second reference object is associated with the first information object, and otherwise the first information object displays data specific the first reference parameter of the first reference object that is attached to the object storage clip if the second reference object is not associated with the first information object.

10. The computer-readable storage medium of claim 9, wherein the instructions, which when executed by a computer, further cause the computer to:
associate the second reference object with the first information object by dragging the second reference object and dropping the second reference object onto the first information object that is displayed in the object display area.

11. A method comprising:
displaying an electronic worksheet that includes an object display area to display one or more objects and an object storage clip for attaching one or more objects in an object stack;
first, displaying a report in the object display area, the report including data related to a first information object;
next, attaching a first reference object to the object storage clip, the first reference object including a first reference parameter; and
then, modifying the displayed report to include only data related to the first information object that is specific to the first reference parameter of the first reference object attached to the object storage clip.

12. The method of claim 11 wherein one or more of the objects are moveable between the object display area and the object storage clip through a drag and drop operation.

13. The method of claim 11 wherein an icon representing an object is displayed in the object stack for each of the objects attached to the object storage clip.

14. The method of claim 11 wherein the first reference object comprises an information object that is used as a reference for displaying data for one or more other information objects.

15. The method of claim 11 wherein the objects may be moved between the object display area where each object may be displayed up to a first size image and the object storage clip where each object is displayed as a second size image in a stacked arrangement with other objects, wherein the second size is smaller than the first size.

16. The method of claim 11 further comprising displaying a second information object on the object display area, where data displayed by the second information object is specific to the first reference parameter of the first reference object attached to the object storage clip.

17. The method of claim 11 further comprising:
associating a second reference object with the first information object, the second reference object including a second reference parameter,
wherein the first information object displays data specific to the second reference parameter of the second reference object that is associated with the first information object.

18. The method of claim 17 wherein the associating comprises dragging the second reference object and dropping the second reference object onto the first information object that is displayed in the object display area.

19. The method of claim 11 further comprising:
displaying a second reference object on the object display area, the second reference object including a second reference parameter,
wherein the first information object displays data specific to the second reference parameter if the second reference object is associated with the first information object, and otherwise the first information object displays data specific the first reference parameter of the first reference object that is attached to the object storage clip if the second reference object is not associated with the first information object.

20. The method of claim 19 further comprising associating the second reference object with the first information object by dragging the second reference object and dropping the second reference object onto the first information object that is displayed in the object display area.

21. An apparatus comprising:
displaying logic configured to display an electronic worksheet that includes an object display area to display one or more objects and an object storage clip for attaching one or more objects in an object stack, and configured to, first, display a report in the object display area, the report including data related to a first information object; and
attaching logic configured to, next, attach a first reference object to the object storage clip, the first reference object including a first reference parameter, wherein the displaying logic is further configured to, then, modify the displayed report in the object display area to include only data related to a first information object that is specific to the first reference parameter of the first reference object attached to the object storage clip.

22. The apparatus of claim 21 further comprising:
associating logic configured to associate a second reference object with the first information object, the first reference object including a second reference parameter,
wherein the first information object displays data specific to the second reference parameter of the second reference object that is associated with the first information object.

23. The apparatus of claim 21 further comprising:
wherein the displaying logic is further configured to display a second reference object on the object display area, the second reference object including a second reference parameter,
wherein the first information object displays data specific to the second reference parameter if the second reference object is associated with the first information object, and otherwise the first information object displays data specific the first reference parameter of the first reference object that is attached to the object storage clip if the second reference object is not associated with the first information object.

* * * * *